United States Patent
Smelyanskiy et al.

(10) Patent No.: US 8,688,957 B2
(45) Date of Patent: Apr. 1, 2014

(54) MECHANISM FOR CONFLICT DETECTION USING SIMD

(75) Inventors: Mikhail Smelyanskiy, San Francisco, CA (US); Yen-Kuang Chen, Cupertino, CA (US); Daehyun Kim, San Jose, CA (US); Christopher J. Hughes, Santa Clara, CA (US); Victor W. Lee, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 633 days.

(21) Appl. No.: 12/974,157

(22) Filed: Dec. 21, 2010

(65) Prior Publication Data

US 2012/0159130 A1    Jun. 21, 2012

(51) Int. Cl.
*G06F 15/00* (2006.01)
*G06F 15/76* (2006.01)

(52) U.S. Cl.
USPC ......................................................... 712/22

(58) Field of Classification Search
None
See application file for complete search history.

(56) References Cited

U.S. PATENT DOCUMENTS

| | | | |
|---|---|---|---|
| 4,953,101 A | 8/1990 | Kelleher et al. | |
| 5,241,633 A | 8/1993 | Nishi | |
| 5,872,987 A | 2/1999 | Wade et al. | |
| 6,591,345 B1 | 7/2003 | Seznec | |
| 7,421,565 B1 | 9/2008 | Kohn | |
| 7,549,081 B2 * | 6/2009 | Robbins et al. | 714/10 |
| 7,627,723 B1 | 12/2009 | Buck et al. | |
| 8,219,783 B2 * | 7/2012 | Hara | 712/22 |
| 2002/0174318 A1 * | 11/2002 | Stuttard et al. | 712/13 |
| 2003/0120880 A1 * | 6/2003 | Banno | 711/155 |
| 2004/0181652 A1 | 9/2004 | Ahmed et al. | |
| 2004/0199729 A1 | 10/2004 | Ross | |
| 2005/0240729 A1 | 10/2005 | Van Berkel et al. | |
| 2007/0283127 A1 | 12/2007 | Kohn | |
| 2008/0071851 A1 | 3/2008 | Zohar et al. | |
| 2009/0172365 A1 | 7/2009 | Orenstien et al. | |
| 2009/0249026 A1 | 10/2009 | Smelyanskiy et al. | |
| 2010/0042779 A1 | 2/2010 | Espasa et al. | |

FOREIGN PATENT DOCUMENTS

| | | |
|---|---|---|
| CN | 101061460 A | 10/2007 |
| EP | 1873627 A1 | 1/2008 |
| JP | 2007-334563 A | 12/2007 |

OTHER PUBLICATIONS

Final Office Action received for U.S. Appl. No. 12/079,774, mailed on Dec. 28, 2010, 20 pages.
Non-Final Office Action received for U.S. Appl. No. 12/079,774, mailed on Jul. 30, 2010, 15 pages.
Patterson, et al., "Computer Architecture: a Quantitative Approach", Morgan Kaufmann Publishers, Inc. Second Edition, 1996, pp. 634-639.
Non-Final Office Action received for U.S. Appl. No. 12/079,774, mailed on Feb. 16, 2012, 16 pages.

(Continued)

*Primary Examiner* — Corey S Faherty
(74) *Attorney, Agent, or Firm* — Grossman, Tucker, Perreault & Pfleger, PLLC (57) ABSTRACT

A system and method are configured to detect conflicts when converting scalar processes to parallel processes ("SIMDifying"). Conflicts may be detected for an unordered single index, an ordered single index and/or ordered pairs of indices. Conflicts may be further detected for read-after-write dependencies. Conflict detection is configured to identify operations (i.e., iterations) in a sequence of iterations that may not be done in parallel.

20 Claims, 5 Drawing Sheets

(56) References Cited

OTHER PUBLICATIONS

International preliminary report on patentability and Written Opinion received for PCT Patent Application No. PCT/US2011/063836, mailed on Jul. 4, 2013, 6 pages.
International Search Report and Written Opinion received for PCT Patent Application No. PCT/US2011/063836, mailed on Jul. 18, 2012, 9 pages.
Office Action received for German Patent Appication No. 11 2009 000 741.4, mailed on Dec. 3, 2012, 12 pages.
A. Shahbahrami, et al., "SIMD Vectorization of Histogram Functions," 2007, pp. 174-179.
T. Scheuermann, et al., "Efficient Histogram Generation Using Scattering on GPUs," 2007, pp. 33-37.
B. He et al., "Efficient Gather and Scatter Operations on Graphics Processors," 2007, pp. 46:1-46:12.
J. H. Ahn, et al., "Scatter-Add in Data Parallel Architectures," 2005, pp. 132-142.
Office Action received for Chinese Patent Appication No. 200980110598.7, mailed on Dec. 14, 2012, 6 pages of Office Action and 8 pages of English Translation.
Office Action received for U.S. Appl. No. 12/079,774, mailed on Jul. 10, 2012, 15 pages.

* cited by examiner

MECHANISM FOR CONFLICT DETECTION USING SIMD

FIELD

The disclosure relates to detecting conflicts in SIMD (single-instruction multiple-data).

BACKGROUND

Many applications have large amounts of data-level parallelism and should be able to benefit from single-instruction multiple-data (SIMD) support. In SIMD execution, a single instruction operates on multiple data elements simultaneously. This is typically implemented by extending the width of various resources such as registers and arithmetic logic units (ALUs), allowing them to hold or operate on multiple data elements, respectively. However, most such applications have been initially designed as scalar processes, i.e., single-instruction single-data (SISD), configured to process one instruction and one data element at a time.

Converting scalar processes into SIMD processes (i.e., "SIMDifying") may provide operational improvement, e.g., shortened processing times. However, a concern in such conversions is ensuring that scalar program order is preserved when necessary. Another concern is ensuring that when data is scattered into memory, the resulting vector of memory addresses includes only unique addresses (i.e., there are no duplicate addresses). Accordingly, conflict detection can facilitate such conversion.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, the present disclosure describes a system and method configured to detect conflicts when converting scalar processes to parallel processes ("SIMDifying"), e.g., to exploit vector processors available in some computer architectures. For example, the 6-core Core i7 980 processor available from the Assignee of the present application includes at least one vector processor configured to execute a vector instruction to process a vector of data. Converting a scalar process to a vector process typically results in a shorter sequence of parallel operations. Each parallel operation corresponds to a number of scalar operations where the number may correspond to a vector length of the system performing the operations.

Conflicts may be detected for an unordered single index, an ordered single index and/or ordered pairs of indices. Conflicts may be further detected for read-after-write dependencies. Conflict detection is configured to identify operations (i.e., iterations) in a sequence of iterations that may not be done in parallel.

As used herein, "index" corresponds to an address of an element included in an array. For example, the array may be specified by, among other things, a base address. An element in the array may be pointed to by the index. The address of the element may then include the base address and the index (i.e., offset).

When SIMDifying a scalar process, data that is to be operated on by the process may be stored in an array and the scalar process may be configured to operate on an element of the array, one element at a time (SISD, single instruction, single data). For example, the scalar process may include a loop where one element is operated on each pass (i.e., iteration) through the loop. Depending on the process, an element may be operated on once, multiple times or not operated on.

For example, a scalar process may include a for loop, e.g., for(i=0; i<N; i++)
   A[Index[i]]++;

configured to increment an element in array A each pass through the loop. In this example, Index is an array of indices corresponding to addresses of elements in array A. i corresponds to an iteration of the for loop and is an index into the array Index. Here, i corresponds to an address of an element in array Index and Index[i] corresponds to an address of an element in array A. In other words, the elements in the array Index are indices into the array A corresponding to addresses of elements in array A. The indices included in the array Index may not be unique indicating that an element in array A is accessed multiple times in the for loop. Conflict detection, according to the teachings presented herein, is configured to detect the case of an element being operated on multiple times and/or ordering dependencies in at least a portion of the scalar process. An element of array A that is operated on multiple times corresponds to multiple elements (indices) in array Index with the same value, i.e., point to the same element in array A.

A method consistent with the present disclosure is configured to detect data dependencies that may arise through reads and/or writes to memory locations unknown until run-time. Such dependencies may be detected by detecting matching indices in a data set. For example, all pairs of indices that might be involved in data dependencies may be compared. In another example, an operation may be performed whose results depend on whether there are matching indices in the data set. In this second example, the results of the operation may then be used to identify matching indices in the data set. Examples of such operations include, but are not limited to vector shuffle operations and scatter and/or gather operations.

Whether there is a conflict and a type of conflict may depend on the operation(s) and/or the data associated with the operation(s). Conflict detection generally includes determining a unique subset of addresses for a vector of VLEN memory addresses, where VLEN is the vector length. Conflict detection may be performed in program order or may be unordered. For operations that are commutative, e.g., addition, conflict detection may be unordered, i.e., may or may not be performed in program order. In other words, the order in which operations are performed do not change a result. Accordingly, the order in which conflicts are detected may not depend on the order in which the operations are performed in scalar processing. For operations that are not commutative, e.g., division, conflict detection may be performed in program order. In other words, the order in which operations are performed may affect the result. Accordingly, the order in which conflicts are detected corresponds to the order in which operations are performed in scalar processing.

For example, histogram operations typically include an operation on an array of data. This may be implemented in a scalar processor as a loop that performs the operation on each element (or some subset of elements) in the array. For example, the following pseudo code (Example 1):

```
for(i=0; i<N; i++)
    hist[Index[i]%HIST_SIZE]++;
``` is configured to increment an element in the array hist each pass through the for loop up to N passes. The element in the array hist is pointed to by Index[i]%HIST_SIZE where % is the modulus operator (i.e., Index[i]%HIST_SIZE corresponds to the remainder of Index[i] divided by HIST_SIZE). In other words, the addresses of the elements in hist correspond to Index[i]%HIST_SIZE. Mapping Example 1 to SIMD includes determining a subset of unique elements (i.e., addresses) in the index vector Index[i]. The subset of unique elements may be determined in arbitrary order for Example 1 because the increment operation is commutative and there is only one index. In other words, the order in which the elements of the array hist are incremented does not affect the result.

In another example (Example 2), the following pseudo code:

```
for(i=0; i<N; i++)
    hist[Index[i]%HIST_SIZE]=1/(hist[Index[i]%HIST_SIZE]+i);
``` is configured to update an element in the array hist each pass through the for loop up to N passes. The element in the array hist is pointed to by Index[i]%HIST_SIZE. The update includes dividing one by the element in the array plus the index i. Similar to Example 1, mapping Example 2 to SIMD includes determining a subset of unique elements (i.e., addresses) in the index vector Index[i]. The subset of unique elements may not be determined in arbitrary order for Example 2 because the division operation is not commutative. In other words, the order in which the elements of the array are processed may affect the result.

In another example (Example 3), the following pseudo code:

```
for(i=0; i<N; i+=VLEN)
    A[Ind_dst[i]]=A[Ind_src[i]];
``` is configured to read an element from array A, pointed to by index Ind_src[i], and to write that element to array A, at a location pointed to by Ind_dst[i]. In other words, vectors Ind_dst and Ind_src contain the addresses of the elements in array A. Mapping Example 3 to SIMD includes determining a subset of elements that may be processed in parallel without violating data dependencies, including read-after-write, write-after-read, and write-after-write dependencies. This mapping may include detecting addresses that are present in one index vector but not the other and/or addresses that are unique in both of the index vectors. Where dependencies exist, the mapping is configured to insure that the operations are performed in program order to avoid the mapping changing a result. For example, a write to A[c] and a read from A[c], where the read from A[c] is configured to occur in a later iteration of the scalar (i.e., sequential) version of the pseudocode may not be executed in parallel. Also, if a read from A[c] is configured to occur before a write to A[c] in sequential program order, mapping to SIMD should not allow the write to execute before the read executes. For example, if the scalar code yields the sequence: A[2]=A[3]; A[5]=A[0]; A[0]=A[5]; A[6]=A[0], mapping to SIMD should ensure that the A[5]=A[0] assignment is executed before or at the same time as the A[0]=A[5] assignment.

Accordingly, a method and system consistent with the present disclosure is configured to detect conflicts in mapping scalar operations to vector operations. The method may include determining a unique subset of elements of a vector of elements. The method may further include preserving program order where order of operations may affect the result.

For example, the method may include utilizing scatter and/or gather operations to detect conflicts. A number of SIMD architectures include architectural support for scatter and/or gather operations. For example, the INTEL Many Integrated Core architecture includes architectural support for scatter and/or gather operations. Gather and/or scatter operations are typically used in vector processors to gather data from possibly sparse memory locations to contiguous memory locations in, e.g., a register, and/or to scatter data from contiguous memory locations in, e.g., the register, to possibly sparse memory locations in, e.g., system memory. Utilizing gather and/or scatter operations and/or other commonly available SIMD operations facilitates conflict detection for unordered indices without additional hardware support. With two hardware extensions, as described herein, the method may be extended to perform conflict detection where the conflicts are detected in program order.

A method, consistent with the present disclosure, may be executed on any architecture that includes support for scatter and/or gather operations. The method may be executed on an architecture that includes support for a programmable vector shuffle. In some embodiments, at least some of the operations, as described herein, may be combined and accelerated by performing the operations in hardware.

Vector gather and vector scatter operations are a form of register indirect addressing for vectors where gathering involves indexed reads and scattering involves indexed writes. For example, for a vector architecture system, with vector length of VLEN (i.e., VLEN-wide SIMD), the vector scatter and gather operations may be defined as:

vgather base, Addr, Dst, mask
vscatter base, Addr, Src, mask where Addr, Dst and Src correspond to vectors and base and mask are scalars. Vgather is configured to gather up to VLEN data elements from VLEN (not necessarily contiguous) memory locations, whose addresses may be computed from base and Addr (e.g., (base[Addr[0]], ..., base[Addr[VLEN-1]])) and to store the data elements contiguously in Dst (e.g., Dst[0], ..., Dst[VLEN-1]). Vscatter is configured to scatter up to VLEN data elements stored contiguously in Src (e.g., Src[0], ..., Src[VLEN-1]) to VLEN memory locations whose addresses may be computed from base and Addr, as described with respect to vgather.

Vgather and/or vscatter may take mask as an input operand. Mask may include VLEN bits and active values of mask may correspond to elements to be scattered and/or gathered. For example, a mask bit equal to one may correspond to an element to be gathered or scattered and a mask bit equal to zero may correspond to an element that is not to be gathered or scattered. If multiple values are scattered to the same memory location in a scatter operation, only one may succeed.

System Architecture

Figure 1:
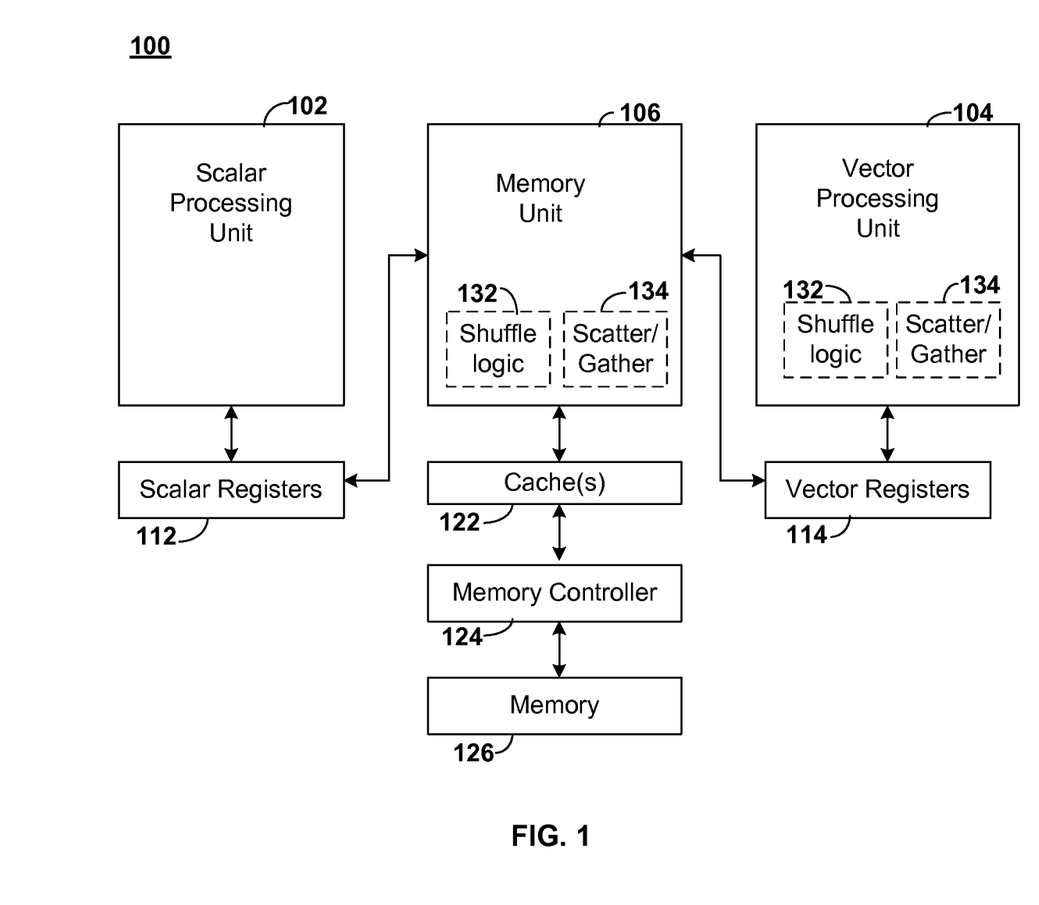
FIG. 1 illustrates one example system embodiment consistent with the present disclosure.

FIG. 1 illustrates one example system 100 embodiment consistent with the present disclosure. The system 100 includes a scalar processing unit 102, a vector processing unit 104 and a memory unit 106. The system 100 may be configured for pipelining and/or parallel processing, as will be understood by those skilled in the art. The system 100 may include scalar registers 112 coupled to the scalar processing unit 102 and the memory unit 106 and vector registers 114 coupled to the vector processing unit 104 and the memory unit 106. The system 100 may further include one or more cache memories 122 coupled to the memory unit 106 and a memory controller 124. The memory controller 126 may be coupled to a memory 126.

The scalar processing unit 102 is configured to perform scalar processing on scalar data, as described herein. For example, the scalar data may be stored in one or more of the scalar registers 112 prior to and/or following processing. The vector processing unit 104 is configured to perform vector processing on vector data, as described herein. For example, the vector data may be stored in one or more of the vector registers 114 prior to and/or following processing.

The memory unit 106 is configured to manage movement of data and/or addresses between the scalar registers 112, vector registers 114 and/or cache(s) 122. The memory controller 124 is configured to manage movement of data and/or addresses between the cache(s) 122 and memory 126.

The vector processing unit 104 and/or the memory unit 106 may include shuffle logic 132 and/or scatter/gather logic 134. The scatter/gather logic is configured to perform scatter and/or gather operations, as described herein. The shuffle logic 132 may be programmable. The shuffle logic 132 is configured to perform a vector shuffle operation. A vector shuffle operation is configured to permute a set of elements. For example, if a shuffle operation is performed on a vector register that contains {A, B, C, D}, a result may be {B, D, C, A}. Shuffle operations may receive multiple sets of inputs (e.g., two or more vector registers), and may select values from either and/or both inputs. In a programmable shuffle operation the permutation is not hard-coded by an application or a compiler. In other words, the operation may receive another input (e.g., from memory or from a register) that identifies elements to output.

Accordingly, a system consistent with the present disclosure may be configured to perform any of the methods as described herein. The system may be further configured to utilize available circuitry functionality, e.g., scatter/gather logic, to perform one or more of the functions. Advantageously, utilizing existing circuitry functionality may provide efficiency in performing the function(s) and may then have a relatively small impact on execution time overhead.

Exemplary Methodology

Figure 2:
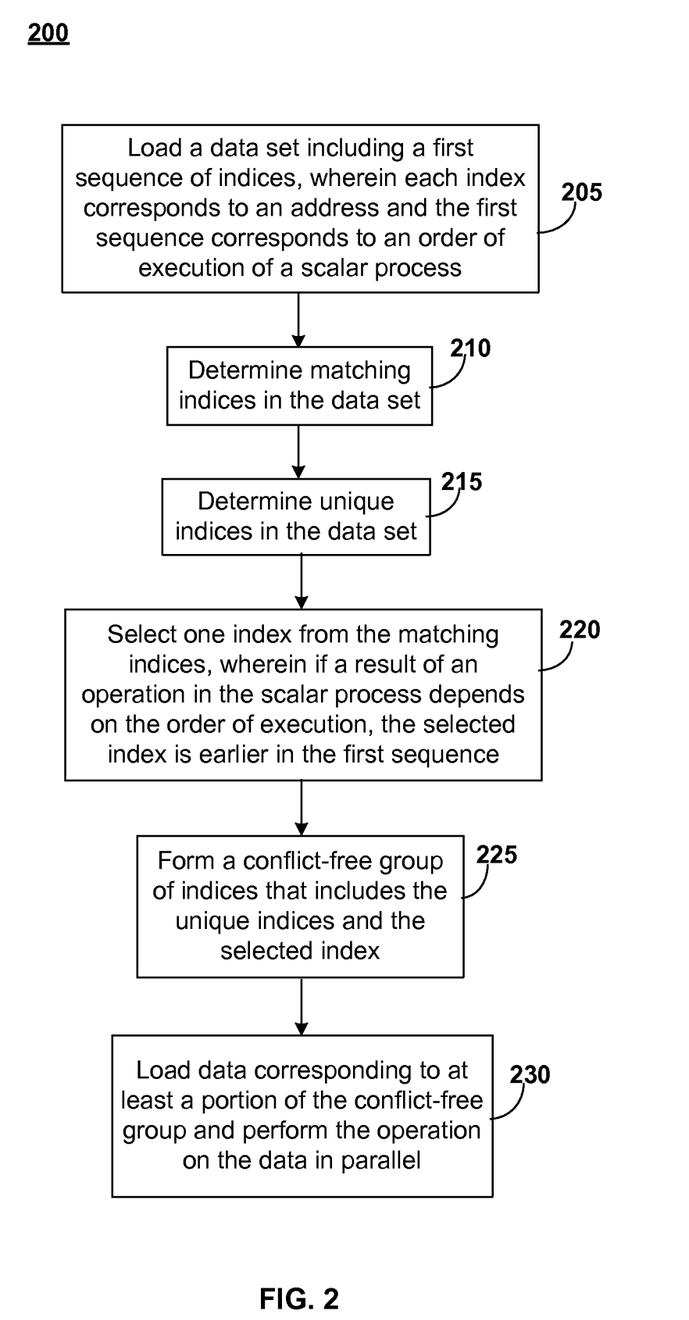
FIG. 2 illustrates a flow chart of example operations for conflict detection consistent with the present disclosure.

FIG. 2 illustrates a flow chart 200 of example operations for conflict detection, consistent with the present disclosure. The operations illustrated in this embodiment may be performed by circuitry and/or software modules associated with a system (e.g., system 100) that includes a vector processor, as described herein.

Flow may begin with operation 205. Operation 205 may include loading a data set including a first sequence of indices wherein each index corresponds to an address and the first sequence corresponds to an order of execution of a scalar process. Matching indices in the data set may be determined at operation 210. For example, matching indices may be determined by performing a scatter and a gather operation on the data set. Unique indices in the data set may be determined at operation 215. Matching indices are configured to indicate a conflict and unique indices are configured to indicate no conflict.

Operation 220 may include selecting one index from the matching indices. If a result of an operation in the scalar process depends on the order of execution (i.e., ordered), then the selected index is configured to be earlier in the first sequence. A conflict-free group of indices that includes the unique indices and the selected index may be formed at operation 225. Operation 230 may include loading data corresponding to at least a portion of the conflict-free group. Operation 230 may further include performing the operation on the data in parallel.

Operations 205, 210, 215, 220, 225 and 230 may be repeated until all of the indices have been consumed. In this manner, conflicts that may interfere with transforming a scalar process into a vector process may be detected and dealt with, facilitating the transformation.

Figure 3:
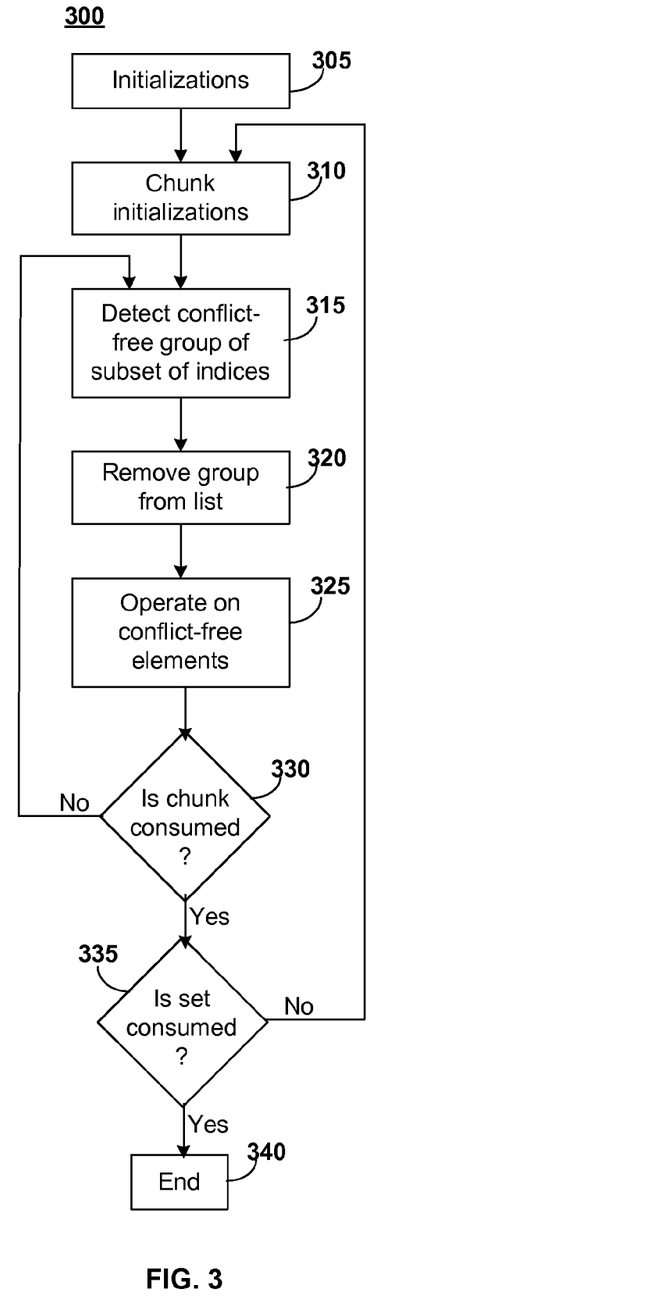
FIG. 3 illustrates a flow chart of example operations for single index conflict detection consistent with the present disclosure.

FIG. 3 illustrates a flowchart 300 of example operations for single index conflict detection, consistent with the present disclosure. The operations illustrated in this embodiment may be performed by circuitry and/or software modules associated with a system (e.g., system 100) that includes a vector processor, as described herein. Table 1 includes one example of pseudo code for unordered single index conflict detection, corresponding to flow chart 300 of FIG. 3.

TABLE 1

```
//initialize some variables
conflictarray=(int*)malloc(MAX_SIZE);
Vmyid={0,1,2, ...VLEN-1};
for(i=0; i < N; i+=VLEN) {
    Vind=vload &Index[i];
    mainmask=all ones;
    do {
        // Stage 1: detect conflict-free group subset of indices
        vscatter conflictarray, Vind, Vmyid, mainmask;
        vgather conflictarray, Vind, Vwrittenid;
        successmask = Vwrittenid= =Vmyid ? mainmask : 0;
        // Stage 2: remove this group from the list
        mainmask = (mainmask & (~successmask)) ;
        // Stage 3: do histogram on conflict-free elements of Vind
        vgather hist, Vind, Vdest, successmask;
        vadd Vdest, Vdest, Vones, successmask;
        vscatter hist, Vind, Vdest, successmask;
    } while(mainmask);
}
```

Flow may begin with operation 305. Operation 305 may include initializations, e.g., declaring and/or initializing variables. For example, an array, "conflictarray" may be allocated with a size MAX_SIZE. Operation 305 may further include declaring and initializing a vector Vmyid of length VLEN. For example, VLEN may correspond to a vector size of a processor. Vector Vmyid may be initialized with unique values (e.g., monotonically increasing integer valued elements, i.e., from zero to VLEN-1), as described herein.

Operations 310, 315, 320 and 325 may be performed for each subset of indices of a set of indices. For example, the set of indices may correspond to indices that correspond to the addresses of the elements of the array hist, as described herein with respect to Example 1. The subset of indices (i.e., "chunk" of indices) may correspond to a length (e.g., VLEN) of a vector of the system that is performing the operations. Accordingly, operation 310 may include chunk initializations. For example, a vector Vind may be loaded with indices Index[i] corresponding to a particular chunk (subset) of indices and a mask (mainmask) may be set to all ones, indicating that all VLEN elements in the chunk are valid. This example assumes that N is a multiple of VLEN, so that all elements are valid for all chunks.

It is further assumed that the processor (e.g., processor 100) configured to execute the exemplary operations illustrated in Table 1, supports vector masks. In other words, when performing a vector operation that is configured to receive N elements as input, it is assumed that the operation is also configured to receive a mask with N bits. If a mask bit is set (e.g., is equal to 1), then the operation may be performed on the corresponding element in N. Otherwise (e.g., the mask bit is zero), then the operation may be skipped (i.e., not performed) on the corresponding element.

A conflict-free group in the subset of indices may be detected at operation 315. For example, at least a portion of the contents of vector Vmyid may be scattered into array conflictarray at locations pointed to by vector Vind. The portion corresponds to the mask mainmask. In other words, value(s) of vector Vmyid corresponding to nonzero bit(s) of mainmask may be scattered into conflictarray. Values of conflictarray at locations pointed to by vector Vind may then be gathered into destination vector Vwrittenid. Vwrittenid may then be compared to Vmyid, element by element (i.e., Vwrittenid[i] is compared to Vmyid[i]), and a corresponding bit in mask successmask may be set to a value of a corresponding bit of mainmask if the elements are equal and to zero otherwise. In other words, if Vwrittenid[i] is equal to Vmyid[i], then Vind[i] is conflict-free and the corresponding $i^{th}$ bit of successmask is set to one. Otherwise, Vind[i] conflicts with some other element Vind[j] (i.e., it has the same value as another element in Vind and may be lower priority) and the $i^{th}$ bit of successmask is set to 0. Accordingly, bits of successmask that are nonzero correspond to the conflict-free group of the subset of indices.

The conflict-free group may be removed from the "list" of indices at operation 320. For example, mainmask may be bit-wise anded with not successmask. As a result, bits of mainmask corresponding to the conflict-free group may be set to zero. Successive passes through operations 315, 320 and 325 may then result in more bits of mainmask being set to zero as conflict-free indices are detected and then operated on.

Operation 325 may include operating on conflict-free elements of Vind. Operation 325 may be performed on the elements of Vind in parallel. For example, continuing with the array hist, described in Example 1 herein, the group of conflict-free elements may be gathered into vector Vdest, vector Vones may be added to Vdest and the result may then be scattered back to memory according to vector Vind. The mask successmask is configured to limit these operations to the conflict-free group identified in operation 315. Whether the chunk has been consumed may be determined at operation 330. If the chunk has not been consumed, flow may return to operation 315.

Operations 315, 320, 325 and 330 may be repeated until Vind has been consumed. If the chunk has been consumed, whether the set has been consumed may be determined at operation 335. If the set has not been consumed, flow may return to operation 310 and a next vector of Index[i] may then be loaded into Vind. If the set has been consumed, operations may end 340. Operations 310, 315, 320, 325, 330 and 335 may be repeated until all N elements of Index[i] have been consumed. Accordingly, unordered single index conflict detection may include a plurality of nested loops. An outer loop is configured to consume chunks of vector Index[i], where each chunk corresponds to a vector length of the system (e.g., system 100). An inner loop is configured to operate on each chunk to detect and/or identify groups of conflict-free elements of the chunk. The inner loop may then operate on and remove the identified group(s). This may be repeated until the chunk has been consumed.

The operations described with respect to FIG. 3 may be less than efficient. First, the operations are predicated on an assumption that conflictarray has been allocated and is large enough to assure that scatters are within array bounds. Ensuring that scatters are within array bounds assumes that the largest value of data stored in Vind is known. In some situations, it may be difficult to know the largest value of Vind, particularly when data may be changing dynamically.

Second, scattering into and/or gathering from a large array are not efficient. On some architectures, the performance of gather/scatter is inversely proportional to the number of cache lines being accessed by a gather/scatter operation. Therefore, gathering/scattering from/into large arrays compared to smaller arrays on such architectures may result in significant performance degradation due to a large number of accessed cache lines as well as cache misses. On other architectures, performance of gather/scatter is independent of the number of cache lines accessed. Gathering/scattering from/into large arrays compared to smaller arrays on such architectures may result in a performance degradation due to increased cache misses.

It may be desirable to limit gather/scatter operations to accessing a smaller array. One exemplary technique for limiting scatter/gather operations to a smaller array is to hash the values of Vind into a smaller array, e.g., of size HashTableSize. The size of the smaller array may be selected to correspond to a single cache line. In one example, a hashing technique may use $\log_2$(HashTableSize) least significant bits (LSBs) from each index value (Vind). In this example, if HashTableSize is, e.g., eight, then $\log_2 8$ (i.e., 3) LSBs from each index value (Vind) may be used to index into the hash table (e.g., Vind_hashed). In another example, a hashing technique may use a modulo operation. In this example, the remainder of the index value (Vind) divided by HashTableSize (e.g., Vind mod HashTableSize) may be used to index into the hash table. If HashTableSize is equal to VLEN, a general programmable vector shuffle operation may be used instead of a gather/scatter operation, if such shuffle is faster than a gather/scatter.

Figure 4:
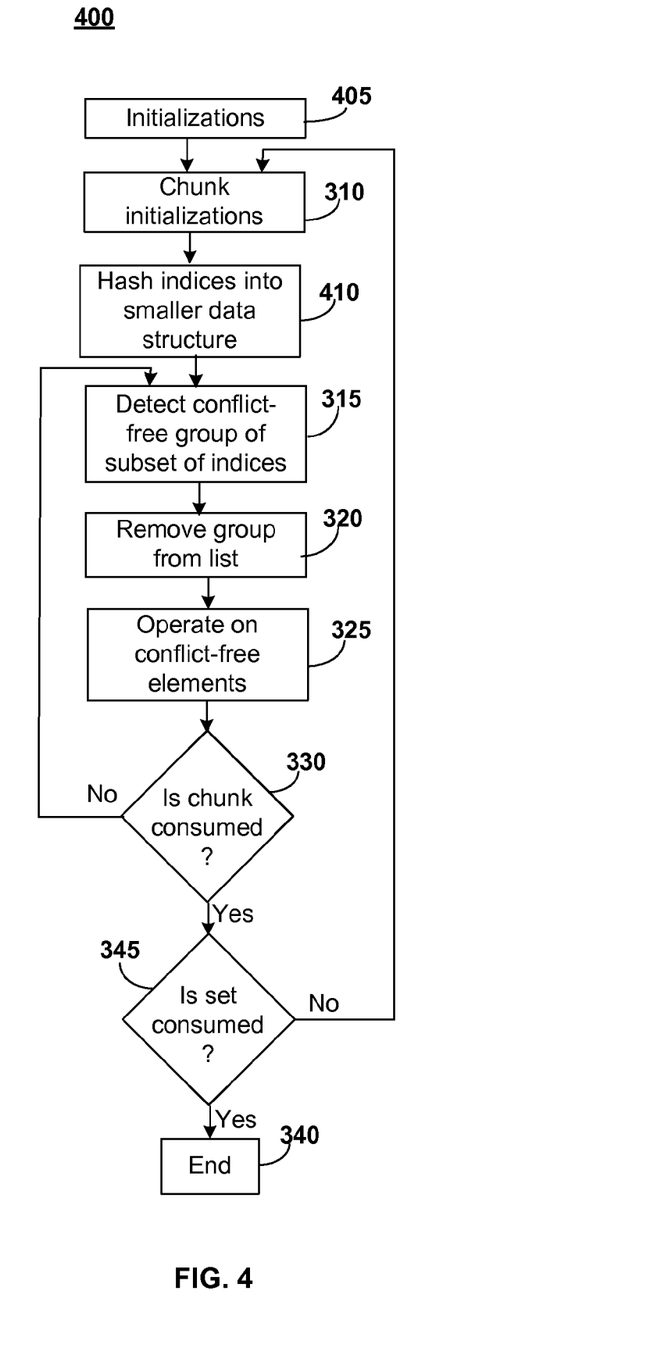
FIG. 4 illustrates another flow chart of example operations for single index conflict detection consistent with the present disclosure.

FIG. 4 illustrates a flow chart 400 of example operations for single index conflict detection consistent with the present disclosure. The operations illustrated in this embodiment may be performed by circuitry and/or software modules associated with a system (e.g., system 100) that includes a vector processor, as described herein. Table 2 includes one example of pseudo code for unordered single index conflict detection, corresponding to flow chart 400 of FIG. 4.

TABLE 2

```
// initialize some variables
__declspec(align(VLEN)) int conflictarray[HashTableSize];
Vmyid={0,1,2, ...VLEN−1};
for(i=0; i < N; i+=VLEN) {
    Vind=vload &Index[i];
    // Hash indices into a smaller data structure
    Vind_hashed=Vind % HashTableSize;
    mainmask=all ones;
    do {
        // Stage 1: detect conflict-free group subset of indices
        vscatter conflictarray, Vind_hashed, Vmyid, mainmask;
        vgather conflictarray, Vind_hashed, Vwrittenid;
        successmask = Vwrittenid= =Vmyid ? mainmask;
        //Stage 2: remove this group from the list
        mainmask = (mainmask & (~successmask)) ;
        //Stage 3: perform histogram on conflict-free elements of Vind
        vgather hist, Vind, Vdest, successmask;
        vadd Vdest, Vdest, Vones, successmask;
        vscatter hist, Vind, Vdest, successmask;
    } while(mainmask);
}
```

The operations depicted in Table 2 and FIG. 4 are similar to the operations depicted in Table 1 and FIG. 3, respectively, except that conflictarray may be of size HashTableSize and indices may be hashed into this conflictarray. Accordingly, only those operations that differ are described.

Flow may begin with operation 405. Operation 405 may include initializations, e.g., declaring and/or initializing variables. For example, an array, "conflictarray" may be declared with size HashTableSize. Conflictarray may be aligned to a vector length (VLEN) of a vector processor (e.g., vector processor 104 of FIG. 1). In some embodiments, conflictarray may be aligned to a cache line size of the processor (e.g., processor 100) configured to execute the operations depicted in flow chart 400. Operation 405 may further include declaring and initializing vector Vmyid, as described herein with respect to operation 305.

Operations 310, 410, 315, 320, 325 and 330 may be performed for each subset ("chunk") of indices of a set of indices. Accordingly, operation 310 may include chunk initializations. For example, a vector Vind may be loaded with indices Index[i] corresponding to a particular chunk (subset) of indices. The vector Vind may then be hashed into vector Vind_hashed at operation 410. For example, Vind may be hashed by performing Vind modulo HashTableSize, as described herein. Operation 410 may further include setting a mask (e.g., mainmask) to all ones. Operation 315 may then be performed using Vind_hashed (instead of Vind), as described herein. Operations 320, 325 and 330 may then be performed, as described herein.

Operations 315, 320, 325 and 330 may be repeated until Vind has been consumed. A next vector of Index[i] may then be loaded into Vind (operation 310) and the operations 315, 320, 325 and 330 may be repeated. Operations 310, 410, 315, 320, 325, 330 and 335 may be repeated until all elements of Index[i] have been consumed. Flow may then end at operation 340.

The operations of flow chart 400 may provide improved efficiency compared to the operations of flow chart 300. For example, the size of conflictarray may correspond to a vector length of the processor configured to execute the operations of flow chart 400. The size of conflictarray may be configured to correspond to a cache line size of the processor. In this manner, the operations of flow chart 400 may be configured to exploit the architecture of the processor configured to perform the operations.

It may be appreciated that hashing may result in a false-positive. In other words, hashing, e.g., the modulo operation, may provide a same result for different indices. Such false positives may then result in a reduction in parallelism.

In histogram Example 1 described herein, conflicts may be detected in arbitrary order. In other words, the order in which elements of the array hist are incremented does not affect the result (increment operation is commutative). In Example 2 described herein, conflicts may not be detected in arbitrary order because the order in which the elements of the array are processed may affect the result (i.e., the division operation is not commutative). Accordingly, conflict detection for a single index where order may affect the result (e.g., Example 2) is performed in program order.

Ordered single index conflict detection may be performed using the methods illustrated in FIG. 3 and/or FIG. 4. For example, the pseudocode illustrated in Table 1 or Table 2 may be used with a different flavor of scatter operation "vscatterp". As described herein, if multiple values are scattered to the same memory location in a scatter operation (e.g., vscatter), only one may succeed. In a typical scatter operation, either no ordering of elements is assumed or overlapping writes may be performed in program order.

In vscatterp, when multiple values are scattered into the same memory location (i.e., have the same index), vscatterp is configured to ensure that the value that is earliest in program order is written last. For example, vscatterp may be configured to write the earliest value in program order last. In another example, vscatterp may be configured to write the earliest in program order and suppress subsequent values. Vscatterp may be implemented in multiple ways. For example, vscatterp may be a new instruction. In another example, vscatterp may correspond to a sequence of instructions that achieve the vscatterp result. Accordingly, the pseudocode illustrated in Tables 1 and 2 may be used to perform ordered single index conflict detection by replacing "vscatter" with "vscatterp". Program order may then be preserved.

In the operations illustrated in FIGS. 3 and 4 and example pseudocode of Tables 1 and 2, conflict detection operations may be performed on a subset (i.e., "chunk") of indices of a set of indices, one chunk at a time. A size of the chunk may correspond to a vector size (i.e., SIMD width (e.g., VLEN)) of the processor performing the operations. In other words, a chunk is processed then a next chunk is processed, and so on until the set of indices has been processed (using, e.g., double nested loops). Performing conflict detection for pairs of indices is relatively more complex, at least in part, because multiple ordering constraints may be present.

Figure 5:
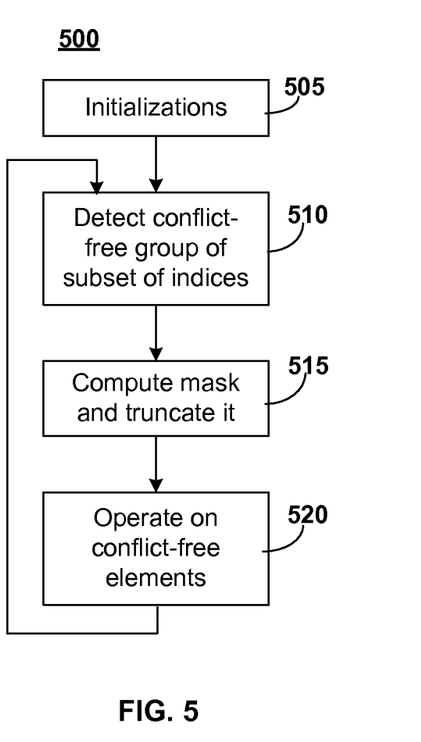
FIG. 5 illustrates a flow chart of example operations for ordered pairs of indices conflict detection consistent with the present disclosure.

FIG. 5 illustrates a flow chart 500 of example operations for ordered pairs of indices conflict detection, consistent with the present disclosure. The operations illustrated in this embodiment may be performed by circuitry and/or software modules associated with a system (e.g., system 100) that includes a vector processor, as described herein. Table 3 includes one example of pseudocode corresponding to flow chart 500.

In flow charts 300 and 400, as described with respect to the example pseudocode of Tables 1 and 2, each subset ("chunk") of indices was processed until the entire subset was consumed before proceeding to a next subset. In flow chart 500 and the example of Table 3, an ordered set of elements may be processed. Rather than operating on a chunk of elements until the entire chunk is consumed in each iteration, as many elements as possible are operated on from the beginning of the subset until a data dependence is detected. For example, if the vector length is VLEN, the current subset begins with element j and a conflict is detected in element j+1, the element j will be consumed in the current iteration. In the next iteration, the next subset will start at element j+1 and will include elements j+1 through j+VLEN. Processing may then proceed until another conflict is detected at, e.g., element j+m, where m is greater than one and less than or equal to VLEN, elements j+1 to j+m−1 may be consumed and the subsequent iteration will begin at j+m. This iterative process may be repeated until the entire set has been operated on and consumed.

Iterating in this manner simplifies conflict detection for ordered pairs of indices. Stopping each iteration at a first detected data dependence allows detecting conflicts by detecting read-after-write dependencies. In other words, if in the scalar program, iteration j writes to a location and iteration j+1 reads from the same location, then in the SIMD version, iteration j+1 should read the value written at iteration j and hence cannot execute in parallel with iteration j. Without iterating in this manner, conflict detection might include detecting write-after-read and/or write-after-write dependencies and would therefore be relatively more complex.

The example in Table 3 shows conflict detection on ordered pairs of indices, stopping at the first detected read-after-write dependence. For example, read-after-write dependencies may be detected using a conflict array "conflictarray". Initially, a constant known value (e.g., CONSTANT) may be written to all elements of the conflictarray. Unique numbers may then be scattered, using, e.g., vscatterp, to conflictarray using the indices (e.g., Ind_dst[i]) from the data array that are to be written to in the scalar case. The indices, Ind_dst[i], may be hashed so that a relatively smaller conflict array may be used as described herein. Data may then be gathered from the conflictarray using the indices (e.g., Ind_src[i]) from the data array that are to be read from in the scalar case. The indices, Ind_src[i], may be hashed, as described herein.

Accordingly, if the gather operation gathers a value that is not CONSTANT, then the set of indices used for scatter and the set of indices used for gather overlaps. An overlap may not necessarily result in a conflict. For example, if in the scalar case, iteration j always reads from index j and writes to index j−1, then the operations can be parallelized. Therefore, if overlap is detected, further processing may be performed to determine whether the overlap in the scatter and gather operations results in a violation of data dependence. This further processing may be performed if a gather index corresponds to a later scalar iteration than the scatter index (i.e., the value should be written prior to the read).

For example, the unique numbers scattered to conflictarray may be monotonically increasing. In other words, the order of the unique numbers is configured to match the scalar iteration order. After performing the gather operation, whether an element j gathered a value from a later iteration (i.e., may violate a data dependence) may be determined by determining whether the $j^{th}$ element gathered is greater than the $j^{th}$ element scattered.

TABLE 3

V_hi = {CONSTANT, CONSTANT, ..., CONSTANT}
V_upperbound = {N, N, ..., N};
while(i<N)
{
　// Stage 1: detect conflict-free group subset of indices
　mainmask = {i, i+1, ..., i+VLEN−1} < V_upperbound;
　Vind_src= vload &Ind_src[i] % VLEN;
　Vind_dst= vload &Ind_dst[i] % VLEN;
　vstore conflictarray, V_hi
　vscatterp conflictarray, Vind_dst, Vmyid, mainmask;
　vgather conflictarray, Vind_src, Vwrittenid, mainmask;
　// Stage 2: compute mask and truncate it
　mainmask = Vwrittenid >= Vmyid ? mainmask;
　vmasktruncateZR(mainmask);
　// Stage 2: perform actual operation on nonconflicting indices
　vgather A, Vind_src, Vsrc, mainmask;
　vscatter A, Vind_dst, Vsrc, mainmask;
　i+= popcount(mainmask);
}

Referring now to FIG. 5 and Table 3, flow may begin with operation 505. Operation 505 may include initializations, e.g., declaring and initializing variables. For example, an array, "conflictarray" may be declared with size HashTableSize, as described herein with respect to FIG. 4 and Table 2 (e.g., HashTableSize may correspond to a vector length VLEN of a processor configured to perform the operations of FIG. 5). A vector, Vmyid, may be declared and may be initialized with monotonically increasing unique values, e.g., {0, 1, 2, ..., VLEN−1}. In the pseudocode of Table 3, it is assumed that the initializations have been performed.

Operation 510 may include detecting a conflict-free group of a subset of indices. Although the subset may correspond to a chunk, a next chunk may overlap a current chunk, depending on whether a read-after-write conflict is detected in the current chunk, as described herein. For example, operation 510 may include setting a mask "mainmask" according to a comparison between the set of iteration numbers for a chunk (i.e., i, i+1, ..., i+VLEN−1) and a vector V_upperbound initialized to N. The mask is configured to identify elements to be operated on in a current iteration. If the subset of indices contains fewer elements than a corresponding vector length (e.g., the subset is near an end of a set of indices (i.e., N−i<VLEN)), then the mask may not be set to all ones.

Operation 510 may further include loading and hashing a first set of indices from Ind_src[i] into a vector Vind_src and loading and hashing a second set of indices from Ind_dst[i] into a vector Vind_dst. Ind_src[i] corresponds to indices that are read from and Ind_dst[i] corresponds to indices that are written to, in the scalar case. Vind_src and Vind_dst may have length VLEN. Ind_src[i] and Ind_dst[i] may be hashed into Vind_src and Vind_dst, respectively, by performing Ind_src[i] modulo VLEN and Ind_dst[i] modulo VLEN, respectively.

Operation 510 may further include storing a set of known, relatively large values (V_hi) to conflictarray. For example, V_hi may correspond to VLEN. If an element is gathered that has not been scattered to, the value of the gathered element may be V_hi (e.g., VLEN), corresponding to an index with no conflict. In other words, V_hi may be selected so that its value is greater than any of the unique (e.g., monotonically increasing) values of Vmyid.

Operation 510 may further include scattering Vmyid to conflictarray using "destination" indices in Vind_dst. For example, Vmyid may be scattered using vscatterp, as described herein. Operation 510 may include gathering the contents of conflictarray into a vector, Vwrittenid, using "source" indices in Vind_src.

As a result of operation 510, if a value in vector Vmyid is greater than a corresponding value in vector Vwrittenid, then a data dependence conflict may exist. This corresponds to the situation where in the scalar sequence an index read from and an index written to are the same and the read occurs after the write.

Operation 515 may include computing a mask. For example, the mask may be computed by comparing a $j^{th}$ value of Vwrittenid with a $j^{th}$ value of Vmyid and if the $j^{th}$ value of Vwrittenid is greater than or equal to the $j^{th}$ value of Vmyid, the corresponding mask bit (of mainmask) is maintained. Otherwise, the corresponding mask bit of mainmask is cleared. In other words, operation 515 is configured to clear the corresponding bit of mainmask if a read-after-write dependency exists.

Operation 515 may further include truncating the mask. For example, the mask (e.g., mainmask) may be truncated using vmasktruncateZR(mainmask). VmasktruncateZR is configured to identify a mask bit corresponding to a first data dependence and to then clear all mask bits after (i.e., more significant than) the identified mask bit. For example, if mask=0b1101, vmasktruncateZR(mask)=0b0001. vmasktruncateZR may be implemented in a number of ways. For example, vmasktruncateZR may be a new instruction. In another example, vmasktruncateZR may correspond to a sequence of instructions configured to achieve the vmasktruncateZR result.

Using vmasktruncateZR on mainmask is configured to guarantee that write-after-read dependencies are respected. A write-after-read dependence may only be violated if the mask bit read from ind[i] is zero while the mask bit of the value written into ind[j] (ind[i]==ind[j]) is 1 and j is greater than i. By truncating the mask at i, the following write is automatically invalidated for this iteration, i.e., will not occur prior to the read.

In other words, after computing the mask, mainmask represents a unique set of elements that may be allowed to execute simultaneously, i.e., that do not violate read after write dependencies. However, other types of conflict may exist, e.g., write after read and/or write after write dependencies. Bits of mainmask may be one for elements that do not violate read after write dependencies but the elements may violate write after read and/or write after write dependencies. VmasktruncateZR is configured to prevent operations that may violate, e.g., write after read and/or write after write dependencies, without specifically identifying such dependencies. Clearing the mask bits results in operations corresponding to the cleared bits being performed in a subsequent iteration.

Operation 520 may include operating on conflict-free elements. For example, elements of array A pointed to by Ind_src[i] and corresponding to mainmask bits of value one, may be gathered into vector Vsrc. Elements of Vsrc may then be scattered into locations of array A pointed to by Ind_dst[i]. In other words, the gather and scatter operation may result in an assignment of a value of array A pointed to by Ind_src[i] to a location in array A pointed to by Ind_dst[i].

Operation 520 may include determining a number of elements actually processed. For example, index i may be incremented by popcount(mainmask) (i.e., the population count, or number of ones, in mainmask) in order to advance index i by the number of elements processed in this operation. Operations 510, 515 and 520 may be repeated until the entire set of indices (e.g., N elements) has been consumed.

Accordingly, the operations of flow chart 500 are configured to scatter (using, e.g., vscatterp) a set of unique (and monotonically increasing with program order) values into a conflict array. The unique values may be stored in a vector register, Vmyid, e.g., at initialization. The destination indices may be stored in another vector register, Vind_dst. The values in the conflict array may then be gathered into another vector register, Vwrittenid, using source indices stored in Vind_src. Vwrittenid may then be compared with Vmyid. If Vwrittenid[i] is greater than or equal to Vmyid[i], then the read-after-write dependency may be respected for the corresponding pair of destination and source indices.

For example, a scalar sequence may include a number of (e.g., four) iterations:

| Iteration ID | Loop instruction |
|---|---|
| 0 | A[2] = A[1] |
| 1 | A[3] = A[1] |
| 2 | A[0] = A[2] |
| 3 | A[1] = A[3] |

A vector Vmyid may then be initialized with unique, monotonically increasing values:
  Vmyid={0, 1, 2, 3}.
In this example, Vmyid corresponds to Iteration ID. Vind_dst for the scatter operation (vscatterp) corresponds to the indices in array A that are written to:
  Vind_dst={2, 3, 0, 1}.
Vind_src for the gather operation corresponds to the indices in array A that are read from:
  Vind_src={1, 1, 2, 3}.
In this example, each index is smaller than the size of conflict array (which is 4 as described below) VLEN, so that hashing is not performed.

Conflictarray may be initialized with a constant, e.g.,
  conflictarray={4, 4, 4, 4}.

Assuming mainmask is all ones, following a scatter operation (vscatterp conflictarray, Vind_dst, Vmyid, mainmask), the elements of Vmyid may be written into conflictarray at locations pointed to by Vind_dst:
  conflictarray={2, 3, 0, 1}.
Specifically, the scatter operation in this example yields
  conflictarray[Vind_dst[i]]=Vmyid[i] for i=0, 1, . . . , 3.
In other words, the first element of Vmyid (i.e., 0) may be written to a location in conflictarray pointed to by the first element in Vind_dst (i.e., 2), the second element of Vmyid (i.e., 1) may be written to a location in conflictarray pointed to by the second element in Vind_dst (i.e., 3), and so on.

Following a gather operation (vgather conflictarray, Vind_src, Vwrittenid, mainmask), the elements of conflictarray may be read from locations pointed to by Vind_src and written to Vwrittenid:
  Vwrittenid={3, 3, 0, 1}.
Specifically, the gather operation in this example yields
  Vwrittenid[i]=conflictarray[Vind_src[i]] for i=0, 1, . . . , 3.
In other words, the second element of conflictarray (i.e., 3, corresponding to Vind_src[0]=1) may be written to the first element of Vwrittenid, the second element of conflictarray (i.e., 3, corresponding to Vind_src[1]=1) may be written to the second element of Vwrittenid, and so on.

A mask may then be computed by comparing Vwrittenid={3, 3, 0, 1} and Vmyid={0, 1, 2, 3}, to yield:
  mainmask={1, 1, 0, 0}.
If a value in vector Vmyid is greater than a corresponding value in Vwrittenid (i.e., Vmyid[i]>Vwrittenid[i]), then a read-after-write data dependence may exist. The values in Vmyid correspond to iteration number (iteration ID) in the scalar sequence. The values in Vwrittenid correspond to the iteration number in the scalar sequence where the "written-to" index is the same as the corresponding "read-from" index. For example, for iteration 0 (Vmyid[0]=0), the read-from index is 1 (Ind_src[0]=1) and for iteration 3 (Vwrittenid[0]=3), the write-to index is 1 (Ind_dst[3]=1). Similarly, for iteration 2 (Vmyid[2]=2), the read-from index is 2 (Ind_src[2]=2) and for iteration 0, the write-to index is 2 (Ind_dst[0]=2).

Accordingly, each mask bit corresponding to Vwrittenid>=Vmyid is one and each mask bit corresponding to Vwrittenid<Vmyid is zero. For example, for the first two elements of Vwrittenid and Vmyid, the mask bit is one and for the last two elements of Vwrittenid and Vmyid, the mask bit is zero. Mainmask then indicates that there is no conflict between the first two loop iterations (i.e., Iteration IDs 0 and 1) so these two iterations may be performed in parallel. Mainmask further indicates that there may be a conflict between the last two loop iterations (i.e., Iterations IDs 2 and 3) and one or the other or both of the first two loop iterations and thus may not be executed in parallel with the first two loop iterations.

By inspection of this rather simple exemplary scalar sequence, it may be appreciated that in the operations corresponding to Iteration IDs 0 and 1, location 1 of array A is read from and locations 2 and 3 of array A are written to. It may be apparent that there are no write-after-read conflicts, read-after-write conflicts or write-after-write conflicts for these two Iteration IDs. Accordingly, the operations corresponding to iteration IDs 0 and 1 may be performed in parallel (i.e., may be "SIMDified").

Continuing with this example, the operations corresponding to Iteration IDs 2 and 3 include, inter alia, reads of locations 2 and 3 of array A and a write to location 1 of array A. Accordingly, the read of location 2 may not be performed in parallel with the write to location 2 (iteration ID 0) and the read of location 3 may not be performed in parallel with the write to location 3 (iteration ID 1), i.e., there exists a read-after-write dependency between iteration ID 0 and iteration ID 2 and between iteration ID 1 and iteration ID 3. Further, the write to location 1 may not be performed in parallel with the reads from location 1, i.e., there exists a write-after-read dependency between iteration ID 3 and iteration ID 0 and/or iteration ID 1.

Accordingly, using a method consistent with the present disclosure (e.g., FIG. 5 and, e.g., Table 3) and yielding a mainmask of $\{1, 1, 0, 0\}$ indicates that operations corresponding to iteration IDs 0 and 1 may be performed in parallel while operations corresponding to iteration IDs 2 and 3 may not be performed in parallel with operations corresponding to iteration IDs 0 and 1. This agrees with conclusions reached by inspection of this rather simple example. Although this example did not include hashing, the operations of flow chart 500 and the example of Table 3 may include hashing, as described herein.

Generally, a system configured to detect conflicts when converting scalar processes to parallel processes has been described. Methods have been described that are configured to detect conflict(s) in an unordered single index, an ordered single index and/or ordered pairs of indices. The method(s) may include a variant of a scatter operation, i.e., vscatterp, that is configured to ensure that when multiple values are scattered into a same location, the value that is earliest in program order is written last. The method(s) may include a mask truncation operation, i.e., VmasktruncateZR(mask), configured to truncate conflict detection for an iteration when a read-after-write dependency is discovered, to prevent other read and/or write conflicts within the iteration. In some embodiments, the method(s) are configured to be executed by a system that includes scatter and gather functions. The scatter and gather functions may then be exploited to efficiently detect conflicts without evaluating all possible combinations of indices.

An exemplary system is described herein. Modifications are possible. For example, memory 126 may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively, memory 126 may comprise other and/or later-developed types of computer-readable memory.

Embodiments of the methods described herein may be implemented in a system that includes one or more storage mediums having stored thereon, individually or in combination, instructions that when executed by one or more processors perform the methods. Here, the processor may include, for example, a scalar processing unit (e.g., scalar processing unit 102 of FIG. 1), a vector processing unit (e.g., vector processing unit 104 of FIG. 1) and/or programmable circuitry. Thus, it is intended that operations according to the methods described herein may be distributed across a plurality of physical devices. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage media may include any type of tangible medium, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may comprise, for example, singly or in any combination, hardwired circuitry, programmable circuitry, state machine circuitry, and/or firmware that stores instructions executed by programmable circuitry.

According to one aspect there is disclosed a method of conflict detection. The method may include loading a data set comprising a first sequence of indices wherein each index corresponds to an address and the first sequence corresponds to an order of execution of a scalar process; determining matching indices in the data set; determining unique indices in the data set; selecting one index from the matching indices, wherein if a result of an operation in the scalar process depends on the order of execution, the selected index is earlier in the first sequence; forming a conflict-free group of indices that includes the unique indices and the selected index; and loading data corresponding to at least a portion of the conflict-free group and performing the operation on the data in parallel.

According to another aspect there is disclosed a system, including one or more storage mediums having stored thereon, individually or in combination, instructions that when executed by one or more processors may result in the following operations: loading a data set comprising a first sequence of indices wherein each index corresponds to an address and the first sequence corresponds to an order of execution of a scalar process; determining matching indices in the data set; determining unique indices in the data set; selecting one index from the matching indices, wherein if a result of an operation in the scalar process depends on the order of execution, the selected index is earlier in the first sequence; forming a conflict-free group of indices that includes the unique indices and the selected index; and loading data corresponding to at least a portion of the conflict-free group and performing the operation on the data in parallel.

According to yet another aspect there is disclosed an apparatus configured to detect conflicts. The apparatus may include a memory; and a processor comprising a scalar processing unit and a vector processing unit. The processor is configured to: load a data set comprising a first sequence of indices wherein each index corresponds to an address in the memory and the first sequence corresponds to an order of execution of a scalar process when using the scalar processing unit; determine matching indices in the data set; determine unique indices in the data set; select one index from the matching indices, wherein if a result of an operation in the scalar process depends on the order of execution, the selected index is earlier in the first sequence; form a conflict-free group of indices that includes the unique indices and the selected index; and load data corresponding to at least a portion of the conflict-free group and perform the operation on the data in parallel using the vector processing unit.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A method of conflict detection, the method comprising:
loading a data set comprising a first sequence of indices wherein each index corresponds to an address and the first sequence corresponds to an order of execution of a scalar process;
determining matching indices in the data set;
determining unique indices in the data set;
selecting one index from the matching indices, wherein if a result of an operation in the scalar process depends on the order of execution, the selected index is earlier in the first sequence;
forming a conflict-free group of indices that includes the unique indices and the selected index; and
loading data corresponding to at least a portion of the conflict-free group and performing the operation on the data in parallel.

2. The method of claim 1, wherein determining matching indices in the data set comprises scattering and gathering.

3. The method of claim 2, wherein the scattering is configured to ensure that an index that is earliest in the order of execution of the scalar process is written to last.

4. The method of claim 2, further comprising:
loading a vector with unique values, wherein the unique values are configured to be scattered and wherein a length of the vector corresponds to a vector length of a vector processor configured to perform the operation.

5. The method of claim 1, wherein the data set comprises hashed values of the first sequence of indices, the hashing configured to facilitate determining the matching indices using an array whose size is smaller than a maximum first index.

6. The method of claim 1, wherein the determining the matching indices in the data set is performed in the order of execution of the scalar process.

7. The method of claim 1, wherein the data set comprises a second sequence of indices and the second sequence corresponds to the order of execution of the scalar process.

8. The method of claim 7, further comprising detecting read-after-write dependencies between the first sequence and the second sequence of indices.

9. The method of claim 8, wherein the portion is determined based, at least in part, on a detected read-after-write dependency.

10. A system comprising, one or more non-transitory storage mediums having stored thereon, individually or in combination, instructions that when executed by one or more processors result in the following operations comprising:
loading a data set comprising a first sequence of indices wherein each index corresponds to an address and the first sequence corresponds to an order of execution of a scalar process;
determining matching indices in the data set;
determining unique indices in the data set;
selecting one index from the matching indices, wherein if a result of an operation in the scalar process depends on the order of execution, the selected index is earlier in the first sequence;
forming a conflict-free group of indices that includes the unique indices and the selected index; and
loading data corresponding to at least a portion of the conflict-free group and performing the operation on the data in parallel.

11. The system of claim 10, wherein determining matching indices in the data set comprises scattering and gathering.

12. The system of claim 11, wherein the scattering is configured to ensure that an index that is earliest in the order of execution of the scalar process is written to last.

13. The system of claim 10, wherein the data set comprises a second sequence of indices and the second sequence corresponds to the order of execution of the scalar process.

14. The system of claim 13, wherein the instructions that when executed by one or more of the processors result in the following operations comprising detecting read-after-write dependencies between the first sequence and the second sequence of indices.

15. An apparatus configured to detect conflicts, the apparatus comprising:
a memory; and
a processor comprising a scalar processing unit and a vector processing unit, the processor configured to:
load a data set comprising a first sequence of indices wherein each index corresponds to an address in the memory and the first sequence corresponds to an order of execution of a scalar process when using the scalar processing unit;
determine matching indices in the data set;
determine unique indices in the data set;
select one index from the matching indices, wherein if a result of an operation in the scalar process depends on the order of execution, the selected index is earlier in the first sequence;
form a conflict-free group of indices that includes the unique indices and the selected index; and
load data corresponding to at least a portion of the conflict-free group and perform the operation on the data in parallel using the vector processing unit.

16. The apparatus of claim 15, wherein the processor comprises scatter and gather logic and determining matching indices comprises scattering and gathering.

17. The apparatus of claim 16, wherein the scattering is configured to ensure that an index that is earliest in the order of execution of the scalar process is written to last.

18. The apparatus of claim 15, wherein the data set comprises hashed values of the first sequence of indices, the hashing configured to facilitate determining the matching indices using an array whose size is smaller than a maximum first index.

19. The apparatus of claim 15, wherein the data set comprises a second sequence of indices and the second sequence corresponds to the order of execution of the scalar process.

20. The apparatus of claim 19, wherein the processor is further configured to detect read-after-write dependencies between the first sequence and the second sequence of indices.

* * * * *